United States Patent Office 2,769,306
Patented Nov. 6, 1956

2,769,306

MEANS FOR SYNCHRONIZING THE SPEEDS OF A PAIR OF AIRCRAFT ENGINES TO WHICH FUEL IS SUPPLIED BY PUMPS AND AIR BY BLOWERS

Thomas Alfred Harris, Edgbaston, Birmingham, England, assignor to Joseph Lucas Limited, Birmingham, England Application November 16, 1950, Serial No. 195,960

4 Claims. (Cl. 60—39.15)

This invention has for its object to provide means for synchronising the engines, (particularly jet engines or turbines) of dual-engined aircraft during acceleration, and thereby minimising or obviating such differences in the rate of acceleration as might cause dangerous yawing during take-off or maneuvering.

The invention comprises the combination with the fuel supply system of each engine, of a by-pass valve adapted to influence (directly or indirectly) the rate of supply of liquid fuel to the associated engine, an electromagnet for actuating the valve, and means responsive to the relative speeds of the two engines for controlling the electromagnets of either valve.

Figure 1:
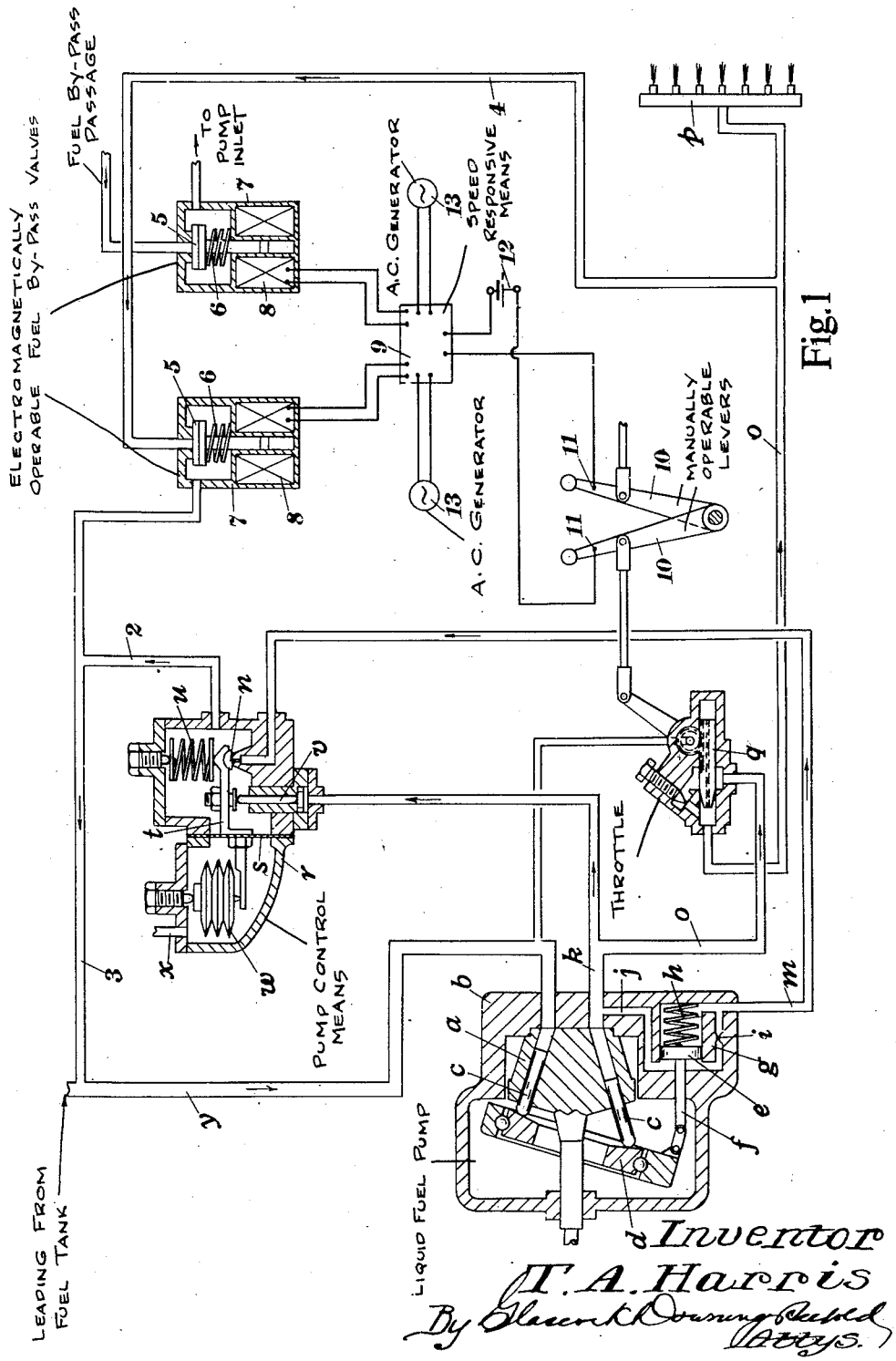
Figure 1 is a diagram illustrating a fuel supply system for an aircraft engine in conjunction with one form of the invention for synchronising the speed of the engine with that of another aircraft engine having a similar fuel supply system.
Figure 3:
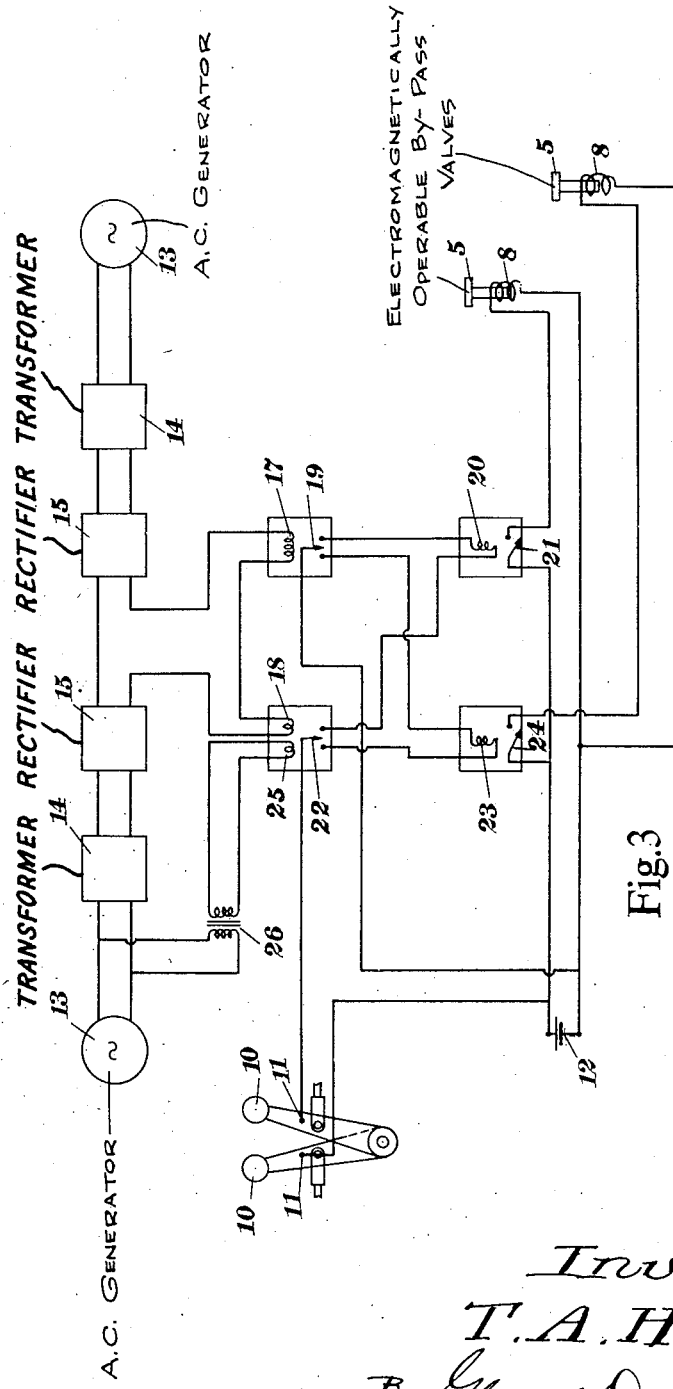
Figure 3 is a diagram illustrating the speed responsive means indicated in Figures 1 and 2.
Figure 4:
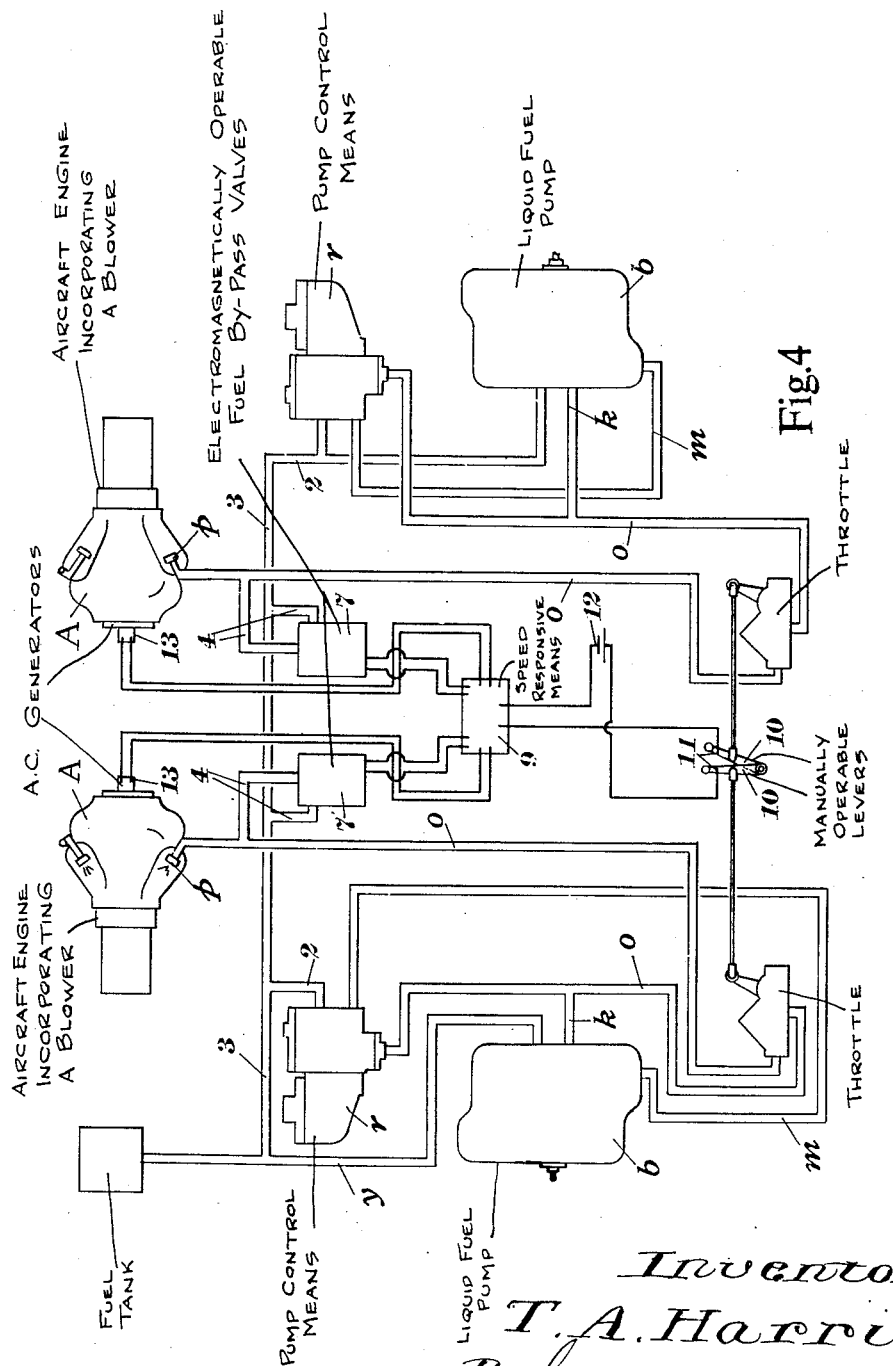
Figure 4 is a diagram illustrating the form of the invention shown in Figure 1 applied to the fuel supply systems of a pair of aircraft engines.

Referring to Figures 1 and 4 in conjunction with Figure 3, there is provided for each of a pair of engines A, a variable-delivery liquid fuel supply pump, the pump output being under the control of a manually operable throttle, and an automatic means responsive to atmospheric pressure and the pump delivery pressure. The engines are of the jet-propulsion or gas-turbine type, and have incorporated with them, in the usual way, blowers for supplying air thereto. Each pump is of known kind and comprises a rotary body *a* contained in a housing *b* and provided with reciprocatory plungers *c* co-operating with an angularly adjustable swash plate *d*. Variation of the obliquity of the swash plate is effected by a liquid-operated servo-mechanism of known form comprising a piston *e* which is connected to the swash plate by a rod *f*. The piston is movable in a cylinder *g* and is loaded at one side by a spring *h*. Both ends of the cylinder are in communication by way of a restricted orifice *i*. Liquid is admitted to one end of the cylinder by way of a passage *j* leading from the discharge passage *k* of the pump. The other end of the cylinder communicates by way of a passage *m* with a vent-controlling valve *n* to be hereinafter described. When the valve *n* is closed equal liquid pressures act on opposite sides of the piston *e*, and the spring *h* then moves the piston in the direction for increasing the pump output. When the valve *n* is open the preponderating liquid pressure acting on one side of the piston moves the latter in opposition to the spring for reducing the pump output.

The liquid fuel discharged by the pump is led along a pipe *o* to the burner *p* in the combustion chamber of the engine by way of a manually operable control throttle *q*.

The means associated with the vent valve *n* for automatically controlling the pump output is responsive to the pressure of the liquid fuel in the discharge passage *k*, and atmospheric pressure. The said means comprises a chambered body part *r* divided into two compartments by a flexible diaphragm *s*, which carries a lever *t* on which the valve *n* is mounted. The lever is loaded by a spring *u*, and is actuated on by a plunger *v* which is responsive to the pressure of the liquid fuel. Also the lever is acted on by an evacuated elastic capsule *w* contained in one of the said compartments which is open to the atmosphere by way of an aperture *x*. The compartment containing the valve *n* is in communication with the fuel inlet pipe *y* of the pump by way of pipes 2, 3.

In applying the present invention to the system above described, the pipe 3 is connected to the pipe *o* (which supplies liquid fuel to the burner *p*) by way of a by-pass pipe 4 (Figures 1 and 4), in which is arranged a bypass valve. This latter comprises a (normally-closed) closure member 5 loaded by a spring 6 and contained in a chambered body part 7. The closure member is movable to its open position by a solenoid 8 under the control of the speed-responsive means shown in Figure 3 and to be hereinafter described. Two such by-pass valves are employed, one of them forming part of the system associated with one of the engines, and the other forming part of the system associated with the other engine.

The solenoids of the two by-pass valves are controlled by speed-responsive means indicated at 9 in Figures 1 and 4, and shown diagrammatically in Figure 3, which means are also under the control of switching means carried by a pair of manually operable levers 10 which are respectively used for actuating the two throttles *q*. On each of such levers is provided a switch contact 11. When the levers are coincident the contacts co-operate for closing a circuit associated with the speed-responsive means, which circuit is connected to any convenient source of direct current at 12. When either lever is moved relatively to the other the contacts are separated and the said circuit is thereby opened.

As illustrated diagrammatically at Figure 3 the speed-responsive means indicated in Figures 1 and 4 includes a pair of alternating current generators 13 one of which is driven by motion derived from one of the engines, and the other by motion derived from the other engine, the frequency of the current generated by each generator being proportional to the speed of the associated engine. In connection with each generator is provided a transformer 14 the voltage of which is proportional to the generator frequency. Also in connection with each transformer is provided a rectifier 15. The two rectifiers are connected in series with the windings of two electromagnets 17, 18 which actuate a pair of two-way switches 19, 22, and the two rectifiers are arranged in opposition so that the current supplied to the electromagnets 17, 18 is equal to the difference of the rectifier currents.

The switch 19 controls the circuits through the windings 20, 23, of another pair of switches 21, 24. Also each of the circuits through 20, 23 is controlled by the switch 22. Moreover the switch 22 is under the control of a vibratory electromagnet 25 the winding of which is supplied with current through a transformer 26 from one of the generators 13. Consequently, whilst current in 18 will bias the switch 22 towards one or the other of its associated contacts, it will receive a vibratory movement, which according to its frequency will vary the mean value of the current flowing through either of the windings 20, 23. The intermittent currents in the windings 20, 23 will impart vibratory movements to the switches 21, 24, and so cause the solenoids 8 to be supplied with current whose mean value depends on the frequency of vibration.

Assuming that the right hand generator 13 is rotating at a faster rate than the other (when the contacts 11 on the levers 10 are in conjunction), the currents in the windings 17, 18 will move both switches 19, 22, to the right causing switch 21 to close and so bring into action the associated solenoid, causing the latter to open the associated by-pass valve to an extent dependent on the current flowing through this switch. The effect of this is to by-pass liquid fuel from the burner p (Figure 1) until the speeds of the two engines have become equalised. Meanwhile no current flows through the winding 23. If the speed of the other engine predominates, causing the left hand generator 13 to rotate faster than the other, the switches 19, 22 will be moved to the left, causing in like manner the other solenoid 8 to be brought into action for slowing down the faster engine until the speeds have been equalised. Meanwhile no current will flow in the winding 20.

In the embodiment of the invention shown in Figure 2, the output of the fuel supply pump of each engine is under the control, not only of an automatic means as described with reference to Figure 1, but also another automatic means which is responsive to pressures corresponding to the fuel-air ratio. This other means comprises a chambered body part 30 which is divided into two compartments by a flexible diaphragm 31, which carries a lever 32 on which is mounted the vent valve 33. This valve controls a vent pipe 34 leading from the pipe m connected to the servo-cylinder g. When the valve 33 is opened it has the same effect on the pump output as the corresponding valve n already described. The lever 32 is loaded by a spring 35 and is also subject to the pressure of liquid fuel conducted along the pipe 36 from the throttle q, and acting on a plunger 37. In the other compartment is contained an evacuated elastic capsule 38 acting on the lever 32, the capsule being subject to the pressure of the air supplied to the engine by the blower, this pressure acting on a diaphragm 39. Air at blower-delivery pressure is conducted from the blower to the diaphragm by a pipe 40 containing a restricted orifice 41. Liquid vented by the valve 33 is returned to the pump inlet by way of the pipe 3.

In this example, each of the by-pass valves 5 is arranged to vent air from the blower pipes 40 to atmosphere, and so vary the action of the fuel-air ratio mechanisms above described for equalising the engine speeds, the solenoids being under the control of speed responsive means as described with reference to Figure 3.

Figure 2:
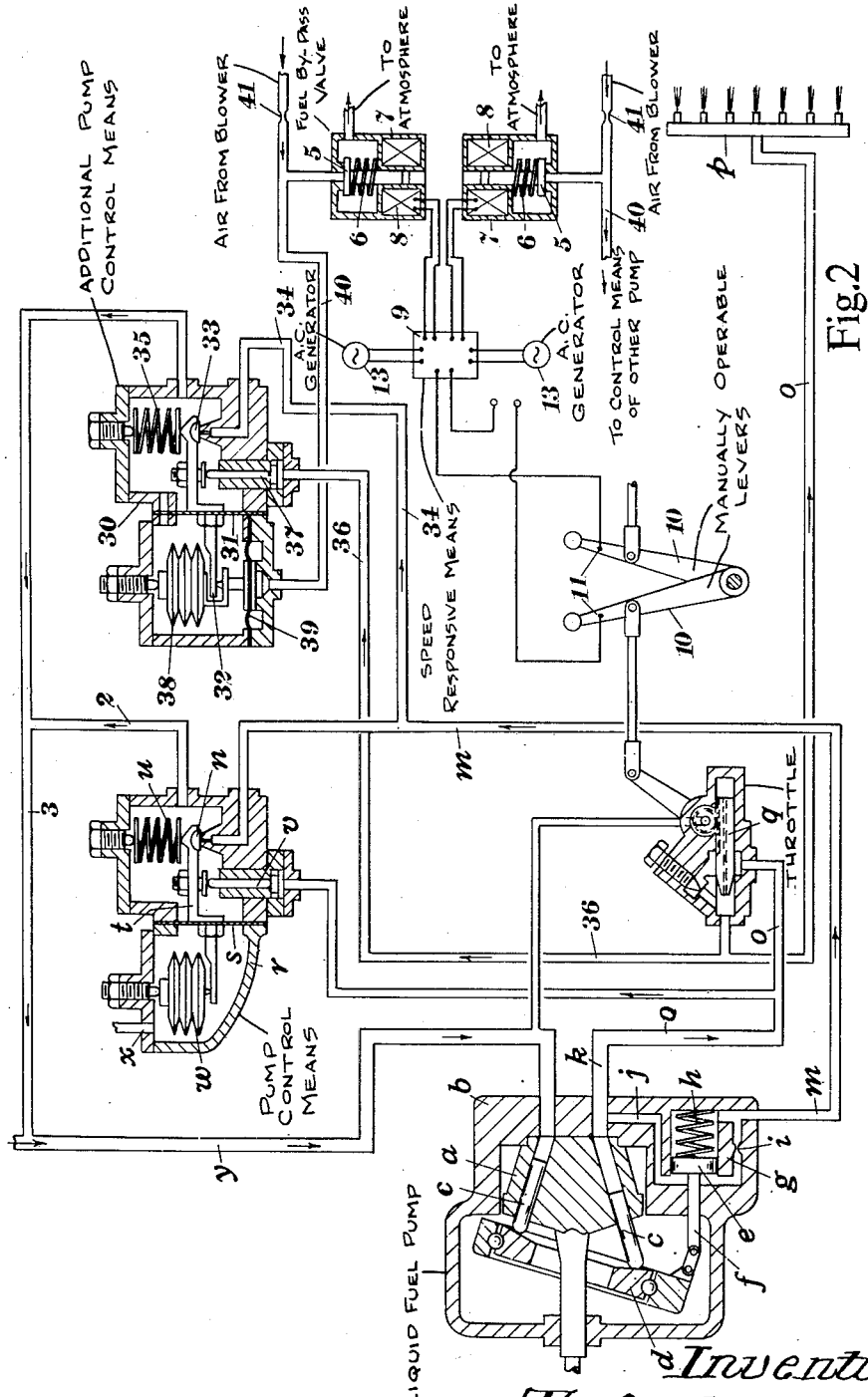
Figure 2 is a similar view to Figure 1 illustrating a modified form of the invention.

In other respects the description of Figure 1 also applies to Figure 2.

When, with either of the arrangements shown in Figure 1 or 3, it is required to operate the engines independently, the levers 10 are moved relatively to each other by the pilot, so separating the contacts 11 and thereby putting out of action the synchronising means above described, and causing both by-pass valves to be closed.

The invention is not, however, restricted to the examples above described and shown in Figures 1 and 2, as the by-pass valves may be arranged in any convenient parts of the fuel supply system where they can influence the rate of supply of fuel to the engines. Also any other convenient means than that shown in Figure 3 may be used for controlling the electromagnets of the by-pass valves.

Having thus described my invention what I claim as new and desire to secure by Letters Patent is:

1. Means for synchronising the speeds of a pair of aircraft engines to which liquid fuel is supplied by pumps and air by blowers, the pumps and blowers being driven by the engines supplied thereby, comprising in combination with a pair of systems for supplying fuel to the engines respectively, a pair of automatic fuel-controlling devices respectively connected to the fuel supply systems and responsive to the pressure of at least one of the fluid mediums supplied by the pumps and blowers, a pair of normally closed valves arranged to serve, when opened, as by-passes for one of the said fluid mediums, and thereby enable the rates of fuel supply from the pumps to the engines to be varied, a pair of electromagnets for opening the valves, and electrical controlling means responsive to differences in the speeds of the engines for selectively energizing the electromagnets.

2. Means for synchronising the speeds of a pair of aircraft engines to which liquid fuel is supplied by pumps and air by blowers, the pumps and blowers being driven by the engines to be supplied thereby, comprising in combination with a pair of systems for supplying fuel to the engines respectively, each fuel supply system being provided with a separate manually-operable throttle, a pair of automatic fuel-controlling devices respectively connected to the fuel supply systems and responsive to the pressure of at least one of the fluid mediums supplied by the pumps and blowers, a pair of normally closed valves arranged to serve, when opened, as by-passes for one of the said fluid mediums, and thereby enable the rates of fuel supply from the pumps to the engines to be varied, a pair of electromagnets for opening the valves, electrical controlling means responsive to differences in the speeds of the engines for selectively energising the electromagnets, and switching means operable with the throttles for rendering the electrical controlling means effective and ineffective.

3. Means for synchronising the speeds of a pair of aircraft engines to which liquid fuel is supplied by pumps and air by blowers, the pumps and blowers being driven by the engines to be supplied thereby, comprising in combination with a pair of systems for supplying fuel to the engines respectively each system being provided with a separate manually-operable fuel-controlling throttle, and with a separate automatic fuel-controlling device responsive in part to the pressure of air supplied to the corresponding engine by its blower, a pair of normally closed valves for by-passing blower air from the automatic fuel-controlling devices respectively, a pair of electromagnets for opening the valves, electrical controlling means responsive to differences in the speeds of the engines for selectively energising the electromagnets, and switching means operable by the throttles for rendering the electrical controlling means effective and ineffective.

4. Means for synchronising the speeds of a pair of aircraft engines to which liquid fuel is supplied by pumps and air by blowers, the pumps and blowers being driven by the engines to be supplied thereby, comprising in combination with a pair of systems for supplying fuel to the engines respectively, a pair of automatic fuel-controlling devices respectively connected to the fuel supply systems and responsive to the pressure of at least one of the fluid mediums supplied by the pumps and blowers, a pair of normally closed valves arranged to serve, when opened, as by-passes for one of the said fluid mediums, and thereby enable the rates of fuel supply from the pumps to the engines to be varied, a pair of electromagnets for opening the valves, and electrical controlling means responsive to differences in the speeds of the engines for selectively energising the electromagnets, the said electrical controlling means comprising a pair of alternating current generators, adapted to be driven by the engines, a pair of transformers connected to and adapted to produce voltages proportional to the speeds of the generators, a pair of rectifiers connected to the transformers, a pair of two-way electromagnetically operable switches having actuating windings connected in series with each other and the rectifiers, the latter being arranged in opposition so that the current supplied to the said windings is equal to the difference between the rectifier currents, an alternating current transformer associated with one of the switches to cause vibratory movement thereof, a transformer through which the alternating current transformer is connected to one of the generators, a direct current system containing a pair of electromagnetically operable switches under the control of the two-way switches for selectively energising the first-mentioned electromagnets, and manually operable controlling switch means in the direct current system.

References Cited in the file of this patent

UNITED STATES PATENTS

| | | |
|---|---|---|
| 1,465,091 | Prince | Aug. 14, 1923 |
| 2,084,800 | Gartner | June 22, 1937 |
| 2,173,913 | Morehouse | Sept. 26, 1939 |
| 2,201,683 | Johansson | May 21, 1940 |
| 2,223,708 | Van Nes | Dec. 3, 1940 |
| 2,248,495 | Dupy | July 8, 1941 |
| 2,258,462 | Martin | Oct. 7, 1941 |
| 2,372,686 | Sedille | Apr. 3, 1945 |
| 2,405,888 | Holley | Aug. 13, 1946 |
| 2,408,451 | Sorensen | Oct. 1, 1946 |
| 2,450,535 | Watson et al. | Oct. 5, 1948 |
| 2,455,390 | Spanogle | Dec. 7, 1948 |
| 2,517,703 | Offner | Aug. 8, 1950 |
| 2,557,679 | Nichols | June 19, 1951 |
| 2,570,832 | Caldwell | Apr. 1, 1952 |
| 2,584,687 | Sharp et al. | Apr. 27, 1952 |